(12) United States Patent
Abe et al.

(10) Patent No.: US 6,530,980 B2
(45) Date of Patent: Mar. 11, 2003

(54) GAS SEPARATION APPARATUS

(75) Inventors: Tetsuya Abe, Ibaraki-ken (JP);
Sadamitsu Tanzawa, Ibaraki-ken (JP);
Seiji Hiroki, Ibaraki-ken (JP);
Yoshinori Tajima, Tokyo (JP); Takashi Futatsuki, Tokyo (JP)

(73) Assignees: Japan Atomic Energy Research Institute, Tokyo (JP); Organo Corporation, Tokyo (JP)

( * ) Notice: Subject to any disclaimer, the term of this patent is extended or adjusted under 35 U.S.C. 154(b) by 0 days.

(21) Appl. No.: 09/915,473

(22) Filed: Jul. 26, 2001

(65) Prior Publication Data

US 2002/0011153 A1 Jan. 31, 2002

(30) Foreign Application Priority Data

Jul. 26, 2000 (JP) ........................................ 2000-225880

(51) Int. Cl.[7] .......................... B01D 15/08; B01D 53/22
(52) U.S. Cl. ................... 96/4; 96/101; 96/108
(58) Field of Search ................ 95/45, 47, 51, 95/52, 54, 82–89, 132; 96/4, 8, 10, 101–108, 130

(56) References Cited

U.S. PATENT DOCUMENTS

| 4,747,854 | A | | 5/1988 | Maroulis et al. | ................ | 55/66 |
|---|---|---|---|---|---|---|
| 4,772,296 | A | * | 9/1988 | Potts | .............................. | 55/67 |
| 5,069,690 | A | | 12/1991 | Henderson et al. | ............. | 55/67 |
| 5,730,779 | A | * | 3/1998 | Chernyakov et al. | ........... | 95/45 |
| 5,759,237 | A | * | 6/1998 | Li et al. | ......................... | 95/41 |
| 5,785,741 | A | * | 7/1998 | Li et al. | ......................... | 96/4 |
| 5,814,127 | A | * | 9/1998 | Li | ................................. | 95/47 |
| 5,855,647 | A | * | 1/1999 | Li et al. | ........................ | 95/45 |
| 5,858,065 | A | * | 1/1999 | Li et al. | ........................ | 95/45 |
| 5,976,222 | A | * | 11/1999 | Yang et al. | ..................... | 95/45 |
| 6,004,377 | A | * | 12/1999 | Tamata et al. | .................. | 95/82 |
| 6,187,077 | B1 | * | 2/2001 | Li | ................................. | 95/47 |

FOREIGN PATENT DOCUMENTS

EP 0 500 040 A1 8/1992 ........... B01D/53/02

OTHER PUBLICATIONS

European Search Report dated Nov. 13, 2001, 3 pages.

* cited by examiner

Primary Examiner—Robert H. Spitzer
(74) Attorney, Agent, or Firm—Rosenthal & Osha L.L.P.

(57) ABSTRACT

A discharge gas containing PFC gas including $CF_4$ and $NF_3$ generated from a manufacturing process (10) is concentrated at a concentrator (18) and then chromatographically separated at a chromatographic separator (20) with nitrogen as a carrier gas. In this manner, $CF_4$ and $NF_3$ within the PFC gas can be separated. In particular, because the gas is once concentrated at the concentrator (18), chromatographic separation can be efficiently achieved. By independently concentrating $CF_4$ and $NF_3$ obtained by the chromatographic separation, high purity gas constituents of the PFC gas can be obtained, and reused at the manufacturing process (10).

29 Claims, 3 Drawing Sheets

GAS SEPARATION APPARATUS

BACKGROUND OF THE INVENTION

1. Field of the Invention

The present invention relates to a gas separation apparatus for separating specific gases from a mixture gas containing a plurality of gases.

2. Description of the Related Art

Conventionally, various gases are used in semiconductor manufacturing processes depending on the process. For example, perfluoro compound (PFC) gas which is a mixture containing fluorine compounds such as $CF_4$, $NF_3$, $C_2F_6$, $C_3F_8$, $SF_6$, and $CHF_3$ is used as a reaction gas at the dry etching process or at the thin film forming process. In these processes, discharge gas is produced which contains the PFC gas.

Because these discharge gases such as PFC cannot be discharged out of the manufacturing line as such, various methods are employed for treating these gases. The treating methods include (i) decomposition in which the PFC gas is decomposed by combustion, catalyst heating, or plasma decomposition; (ii) membrane separation in which these materials are separated by a membrane; and (iii) subzero cooling separation in which the separation is achieved taking advantage of the difference in the boiling points of the gases.

However, in the above method (i), there are shortcomings in that a complete decomposition is difficult and the gas cannot be recovered for reuse because the gas is decomposed and discharged. In the membrane separation (ii), although nitrogen in the discharge gas can be removed, the separation between $CF_4$ and $NF_3$ or the like which have similar molecular size is difficult. In the above method (iii), the overall size of the apparatus becomes large, resulting in increased cost for the equipment and increased running cost. Moreover, because the boiling point difference between $CF_4$ and $NF_3$ is only 1° C., the separation is difficult.

SUMMARY OF THE INVENTION

One object of the present invention is to provide a gas separation apparatus capable of separating a mixture gas having a plurality of gas constituents inexpensively and with high purity.

In order to achieve the object mentioned above, according to one aspect of the present invention, there is provided a gas separation apparatus for separating specific gases from a mixture gas to be treated containing the specific gases, the apparatus comprising: a concentrator for concentrating the specific gases within the mixture gas to be treated; and a separator for chromatographically separating the mixture gas, with the specific gases concentrated by the concentrator, into each of the plurality of gas constituents.

In this manner, by using a separator which performs chromatographic separation, separation of specific gases, such, for example, as $CF_4$ and $NF_3$, contained in the mixture gas to be treated, which are otherwise difficult to be separated, can be reliably achieved. The separated $CF_4$ and $NF_3$ can then be recovered and reused.

By providing a concentrator before the separator, the specific gases, for example, $CF_4$ and $NF_3$ can be reliably separated at the separator.

According to another aspect of the present invention, there is provided a gas separation apparatus for separating specific gases from the mixture gas to be treated containing the specific gases, the apparatus comprising: a separator for chromatographically separating the mixture gas to be treated into each of the plurality of gas constituents; and concentration means for independently a concentrating the mixture gas separated into each of the plurality of gas constituents and obtained at the separator; wherein the concentrated gases obtained by the concentrator are recovered and reused.

A carrier gas (for example, nitrogen) is included in the chromatographically separated specific gases, such, for example, as $CF_4$ and $NF_3$. By removing the carrier gas by the concentration means, the specific gases can be recovered and reused.

According to another aspect of the present invention, there is provided a gas separation apparatus for separating specific gases from a mixture gas to be treated containing the specific gases, the apparatus comprising: a front concentrator for concentrating the specific gases within the mixture gas to be treated; a separator for chromatographically separating the gases, with the specific gases concentrated by the upstream concentrator, into each of the plurality of constituents; and rear concentrators for independently concentrating the mixture gas separated into each of the plurality of gas constituents and obtained at the separator; wherein the concentrated gas obtained by the rear concentrators are recovered and reused.

With this apparatus, the specific gases can be separated effectively and in high concentrations. Therefore, each of the obtained specific gases can be easily reused.

According to another aspect of the present invention, it is preferable that a mixture gas containing the specific gases having a plurality of gas constituents is the PFC gas discharged from a semiconductor manufacturing process and the mixture gas to be treated contains nitrogen as another gas.

According to another aspect of the present invention, it is preferable that the PFC gas contains one of fluorine compounds having at least one of the elements C, N, and S as a composition element.

According to another aspect of the present invention, it is preferable that the PFC gas includes one of $CF_4$, $NF_3$, $C_2F_6$, $C_3F_8$, $SF_6$, or $CHF_3$.

According to another aspect of the present invention, it is preferable that the above-mentioned concentration means is either a membrane separator which takes advantage of the permeability/impermeability of a membrane or a subzero cooling separator which takes advantage of the difference in boiling point. With such a concentration means, concentration of the PFC gas, for example, can be effectively performed.

According to another aspect of the present invention, it is preferable that a plurality of chromatographic columns are provided and used in sequence. By using a plurality of columns, the separation process can be performed almost continuously.

According to another aspect of the present invention, it is preferable that the gases other than the specific gases separated at the separator contains nitrogen as its main constituent and the nitrogen gas is reused in a given usage.

According to another aspect of the present invention, it is preferable to perform a process to remove gas constituents other than the nitrogen gas on the gas containing nitrogen gas as its main constituent.

DESCRIPTION OF PREFERRED EMBODIMENT

Figure 1:
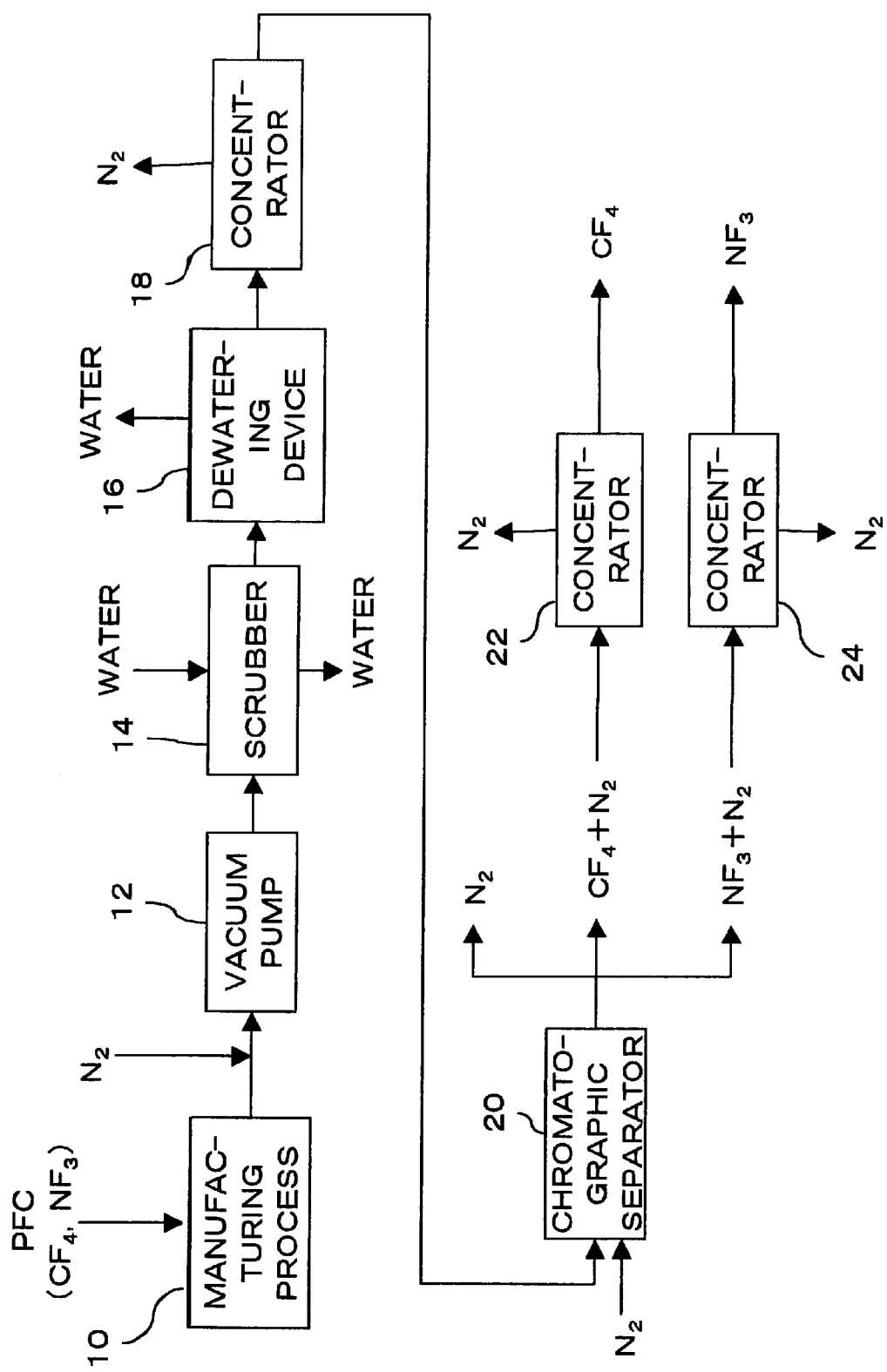
FIG. 1 is a diagram showing a schema of one of the embodiments of the present invention.

A preferred embodiment of the present invention will now be described referring to the drawings.

A PFC gas is supplied in a manufacturing process 10 such as etching or thin film formation at a semiconductor manufacturing plant. A discharge gas containing the PFC gas is thus produced. The inlet side of a vacuum pump 12 is connected to the path for the discharge gas and the discharge gas containing the PFC gas is discharged from the manufacturing process 10 by the vacuum pump 12. As the mixed PFC gas, $CF_4$, $NF_3$, $C_2F_4$, $SF_6$, or the like or a a combination thereof are suitably used. In this example, the PFC gas contains $CF_4$ and $NF_3$. Here, because the PFC gas decomposes in the manufacturing process 10 to generate hydrofluoric acid, the discharge gas also contains hydrofluoric acid. Because of this, if the discharge gas is directly introduced into the vacuum pump 12, the vacuum pump 12 may be damaged. In order to cope with this problem, nitrogen gas is supplied as a diluting gas, from the discharge gas path to the vacuum pump 12, to dilute the discharge gas.

The outlet side of the vacuum pump 12 is connected to a scrubber 14. The discharge gas which is diluted by nitrogen is supplied to the scrubber 14. The scrubber 14 employs water shower to dissolve and absorb hydrofluoric acid (HF) within the discharge, gas into water.

The discharge gas from the scrubber 14 is then introduced to a dewatering device 16, where water is removed. The discharge gas from the scrubber 14 contains a large amount of water and it is desirable to remove water for the subsequent processes. Any form of dewatering device can be used as the dewatering device 16, but it is preferable to employ a dewatering device in which water is removed by reducing the temperature of the discharge gas.

The discharge gas containing the PFC gas and nitrogen thus obtained is supplied to a concentrator 18. The concentrator 18 is for removing nitrogen and is preferably a membrane separator which uses a gas permeation membrane. With this structure, nitrogen is separated from the discharge gas and the PFC mixed gas ($CF_4$ and $NF_3$ in the embodiment) is concentrated. It is also possible to use a subzero cooling device as the concentrator 18. More specifically, although the boiling points for $CF_4$ and $NF_3$ are similar (−128° C. and −128.8° C., respectively), the boiling point of nitrogen is significantly different (−195° C.). Nitrogen can thus be easily separated using this difference in the boiling points in order to concentrate the PFC gas.

After PFC gas is concentrated in this manner, the gas is supplied to a chromatographic separator 20. The chromatographic separator 20 includes a column filled with a desired filler. The gas is passed through the column. In this manner, the gas is separated into the constituents because the constituents have different retention times due to difference in the affinity (tendency for adsorption and distribution coefficient) of the gas constituents with respect to the filler. As a filler, for example, silica gel or molecular sieve can be used for separating $CF_4$ and $NF_3$. In the chromatographic separator 20, nitrogen is used as a carrier gas and $CF_4$ and $NF_3$ are separated by sequentially desorbing and discharging $CF_4$ and $NF_3$ adsorbed on the filler. When a fraction having both $CF_4$ and $NF_3$ is generated, it is preferable to return this fraction to the separator inlet side.

For example, while passing nitrogen gas, a predetermined amount of discharge gas can be mixed with nitrogen gas, and a fraction containing $CF_4$ and a fraction containing $NF_3$ can be separately collected.

It is also preferable to provide a plurality of columns as the chromatographic separator 20, supply the discharge gas to each column in sequence, and collect each fraction from each column in sequence.

Figure 2:
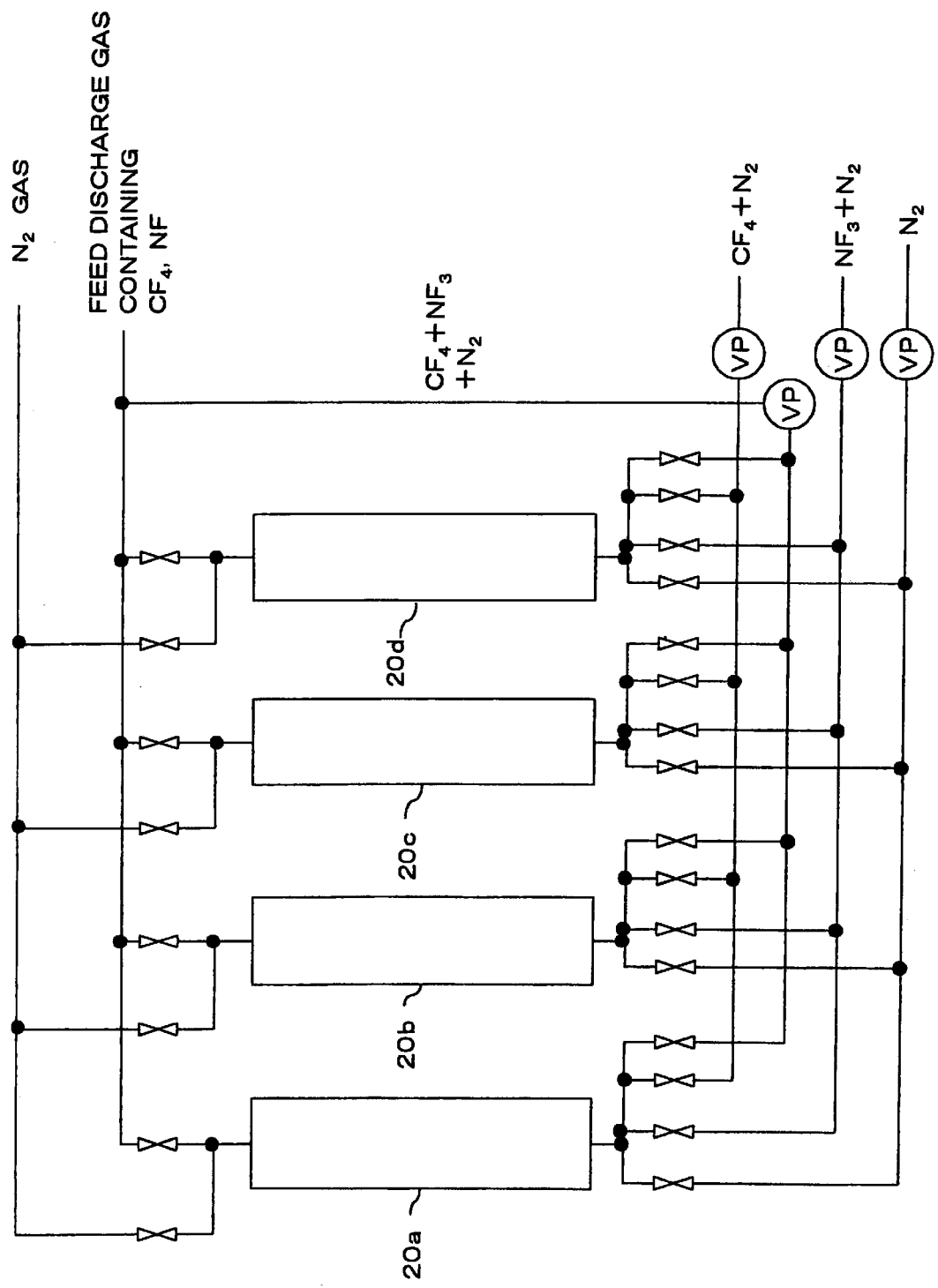
FIG. 2 is a diagram showing a structure of a chromatographic separator which consists of a plurality of columns.

FIG. 2 shows a configuration example in which four columns 20a, 20b, 20c, and 20d are provided, and fractions are obtained by supplying the discharge gas to the columns in sequence. For example, nitrogen can be continuously supplied to the columns 20a, 20b, 20c, and 20d as a carrier gas, and the discharge gas can be introduced to the columns in sequence by switching the valves at the column inlet side in sequence. Because gas of nitrogen, gas of $CF_4$ and nitrogen, gas of $CF_4$, $NF_3$ and nitrogen, and gas of $NF_3$ and nitrogen flows out from each of the columns 20a, 20b, 20c, and 20d, in that order, the gases can be separated and discharged by switching the valves at the column exit side in sequence and actuating corresponding one of vacuum pumps VP. The gas containing both $CF_4$ and $NF_3$ is circulated to the column into which the discharge gas is being introduced.

In this manner, gas of nitrogen, gas of $CF_4$ and nitrogen, and gas of $NF_3$ and nitrogen are obtained at the exit of the chromatographic separator 20.

It is preferable to perform the collection of the gas for each constituent at the exit of the chromatographic separator 20 and the switching of the valves in FIG. 2 based on an analysis result of the gas at the exit. For example, constituents can be detected using a differential thermal detector (TCD) or Fourier transform-infrared analyzer (FT-IR), and the control can be performed based on the analysis.

With this process, the gas is separated into the constituents, and thus, in the fractions of $CF_4$ and nitrogen, and of $NF_3$ and nitrogen, a pure mixture can be obtained with almost no other materials present.

The obtained gas of $CF_4$ and nitrogen is supplied to a concentrator 22 and the obtained gas of $NF_3$ and nitrogen is supplied to a concentrator 24. As the concentrators 22 and 24, a membrane separator or a subzero cooling device is used, similar to the concentrator 18. In particular, by circulating the concentrated gas several times in a membrane separator or by using a multiple membrane separator, or using a subzero cooling separator, almost 100% of the nitrogen can be separated, leaving a pure, 100% concentration of $CF_4$ gas and $NF_3$ gas.

The obtained $CF_4$ gas and $NF_3$ gas can then be recovered and reused at the manufacturing process 10.

In this manner, in the embodiment, the separation of $CF_4$ and $NF_3$, which is difficult in other separation methods, can be reliably achieved using the chromatographic separator 20. The separated $CF_4$ and $NF_3$ can be recovered and reused.

In particular, in the embodiment, a concentrator 18 is provided before the chromatographic separator 20 for removing nitrogen once. In this manner, $CF_4$ and $NF_3$ can be reliably separated at the chromatographic separator 20 using nitrogen as a carrier gas. The concentrations of $CF_4$ and $NF_3$ in the fractions can be maintained at a certain high concentration.

Moreover, in the embodiment, for the fractions of gas of $CF_4$ and nitrogen, and gas of $NF_3$ and nitrogen, nitrogen is removed by separate concentration processors 22 and 24. Because of this, almost 100% of nitrogen can be removed, so that $CF_4$ and $NF_3$ can be reused at the manufacturing process 10.

The PFC gas may include, in addition to $CF_4$ and $NF_3$, $C_2F_4$ and $SF_6$, etc. These PFC gases can be separated relatively easily by various devices. In the chromatographic separator 20, these PFC gas constituents appear as fractions that are far apart, and thus, the fraction containing these PFC gas constituents can be respectively separated from the fraction separated as nitrogen in the above example.

Also, nitrogen is discharged at the concentrator 18, chromatographic separator 20, and concentrators 22 and 24. Nitrogen, on the other hand, is necessary as the diluting gas before the vacuum pump 12 and as the carrier gas for the chromatographic separator 20. It is therefore preferable to reuse the obtained nitrogen gas. The decision on where the obtained nitrogen is reused can be arbitrary, but because the diluting gas before the vacuum pump 12 is close to a crude gas, it is preferable to reuse nitrogen as the diluting gas.

It is highly probable that the nitrogen gas to be reused contains some amount of the PFC gas. Therefore, it is preferable to process the nitrogen gas to remove the PFC gas. As the process, it is preferable to employ a known method for decomposing the PFC gas, such, for example, as plasma decomposition process, combustion, and catalyst heating process. It is also possible to perform the membrane process, subzero cooling separation, and chromatographic separation again for separating the PFC gas and reuse nitrogen.

Figure 3:
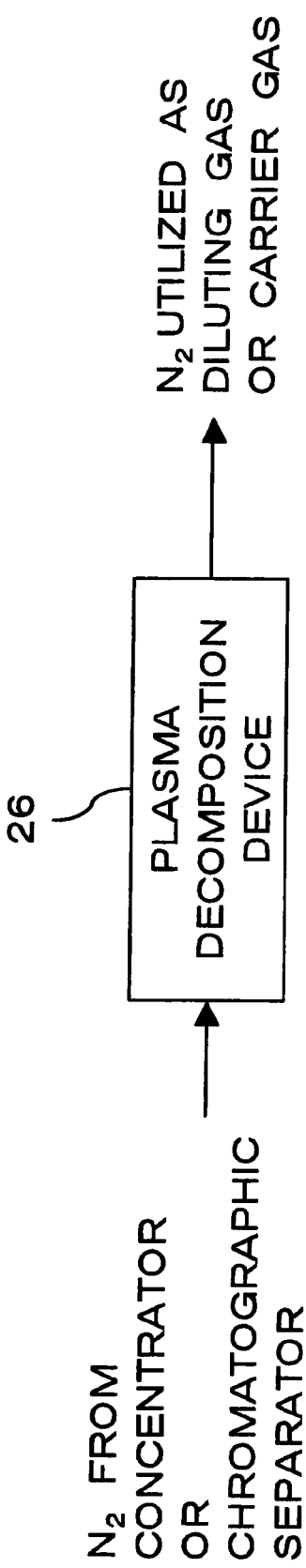
FIG. 3 is a diagram showing the treatment of nitrogen.

FIG. 3 shows an example where the plasma decomposition process is employed. As shown, nitrogen discharged at the concentrator 18, 22, and 24 is subjected to the plasma decomposition process at the plasma decompose device 26 to decompose the PFC gas, and the obtained nitrogen is reused as the diluting gas or the carrier gas.

EXAMPLE 1

As a sample discharge gas, nitrogen gas was prepared having 0.01% of $CF_4$ and 0.01% of $NF_3$ (volume percent). The sample discharge gas was introduced to the concentrator 18 of the apparatus shown in FIG. 1, and processing experiment was performed at each of the subsequent processes.

A membrane separator was used as the concentrator 18. the sample gas was concentrated using the membrane separator to a point where both the concentrations for $CF_4$ and $NF_3$ are equal to or greater than 10%. Then, the concentrated mixed gas was passed through the chromatographic separator 20 with the column filled with silica gel and using nitrogen as a carrier. As a result, gas of $CF_4$ and gas of $NF_3$ were separated and discharged in that order at the column exit, due to the difference in the retention times. Respective concentrations of $CF_4$ and $NF_3$ in nitrogen was 0.01% and the purity was 100%. By removing nitrogen at the concentrators 22 and 24 (membrane separators), gases of $CF_4$ and $NF_3$ were obtained each with almost 100% concentration.

The analysis of the nitrogen obtained at the concentrator 18, chromatographic separator 20, and concentrators 22 and 24 indicated that the nitrogen gas contained 10 ppm of PFC gas. The PFC gas was almost completely decomposed and rendered harmless by applying a plasma decomposition process to the obtained nitrogen. It was thus confirmed that the nitrogen gas is usable as a diluting gas before the vacuum pump 12 or as a carrier gas for the chromatographic separator 20.

What is claimed is:

1. A gas separation apparatus for separating specific gas constituents from a mixture gas to be treated containing a plurality of gas constituents, said apparatus comprising:

a concentrator for concentrating the specific gas constituents within said mixture gas to be treated as a discharge gas; and a separator for chromatographically separating the discharge gas into each of the plurality of gas constituents, wherein the separator comprises a plurality of chromatographic columns, wherein the plurality of chromatographic columns are sequentially supplied with the discharge gas and a carrier gas that comprises gas constituents other than the specific gas constituents, and wherein the specific gas constituents that separate from the plurality of chromatographic columns are orderly collected at different timings.

2. A gas separation apparatus of claim 1, wherein said mixture gas having a plurality of gas constituents is PFC gas discharged from a semiconductor manufacturing process and said gas to be treated contains nitrogen as another gas.

3. A gas separation apparatus of claim 2, wherein said PFC gas contains one of fluorine compounds including at least one element of C, N, and S as a composition element.

4. A gas separation apparatus of claim 3, wherein said PFC gas includes one of $CF_4$, $NF_3$, $C_2F_6$, $C_3F_8$, $SF_6$, or $CHF_3$.

5. A gas separation apparatus of claim 1, wherein said concentrator is a membrane separator which takes advantage of the permeability/impermeability of a membrane.

6. A gas separation apparatus of claim 1, wherein said concentrator is subzero cooling separator which takes advantage of differences in boiling points.

7. A gas separation apparatus of claim 1, wherein gas constituents other than the specific gas constituents, separated at said concentrator or at said separator, contain nitrogen gas as a main constituent and the nitrogen gas is reused for a given usage.

8. A gas separation apparatus of claim 7, further comprising another separator for removing non-nitrogen gas constituents from the gas constituents other than specific gas constituents, that contain nitrogen gas as the main constituent.

9. The gas separation apparatus of claim 1, further comprises:

a single pump for discharging the specific gas constituents from the plurality of chromatographic columns by switching.

10. The gas separation apparatus of claim 1, wherein the plurality of chromatographic columns comprises:

four chromatographic columns that are supplied with the discharge gas in sequence;

wherein each of the four chromatographic columns comprise a discharge pump that is connected to each of the four chromatographic columns, such that four types of gas constituents are produced from the four chromatographic columns.

11. A gas separation apparatus for separating specific gas constituents from a mixture gas to be treated containing a plurality of gas constituents, said apparatus comprising:

a separator for chromatographically separating a mixture gas to be treated into each of the plurality of gas constituents; and concentrators for separately concentrating the gas separated into each of the plurality of gas constituents and obtained at the separator; wherein the concentrated gases obtained by said concentrators are recovered and reused.

12. A gas separation apparatus of claim 11, wherein
said mixture gas having a plurality of gas constituents is PFC gas discharged from a semiconductor manufacturing process and said gas to be treated contains nitrogen as another gas.

13. A gas separation apparatus of claim 12, wherein
said PFC gas contains one of fluorine compounds including at least one element of C, N, and S as a composition element.

14. A gas separation apparatus of claim 13, wherein
said PFC gas includes one of $CF_4$, $NF_3$, $C_2F_6$, $C_3F_8$, $SF_6$, or $CHF_3$.

15. A gas separation apparatus of claim 11, wherein
at least one of said concentrator is a membrane separator which takes advantage of the permeability/impermeability of a membrane.

16. A gas separation apparatus of claim 11, wherein at least one of said concentrators is a subzero cooling separator which takes advantage of differences in boiling points.

17. A gas separation apparatus of claim 11, wherein
said chromatographic separator includes a plurality of chromatographic columns which are used in sequence.

18. A gas separation apparatus of claim 11, wherein gas constituents other than the specific gas constituents, separated at said concentrator or at said separator, contain nitrogen gas as a main constituent and the nitrogen gas is reused for a given usage.

19. A gas separation apparatus of claim 18, further comprising another separator for removing non-nitrogen gas constituents from the gas constituents other than specific gas constituents, that contain nitrogen gas as the main constituent.

20. A gas separation apparatus for separating specific gas constituents from a mixture gas to be treated containing a plurality of gas constituents, said apparatus comprising:
    a front concentrator for concentrating the specific gas constituents within said mixture gas to be treated as a concentrated gas;
    a separator for chromatographically separating the concentrated gas into each of the plurality of gas constituents; and
    rear concentrators for separately concentrating the each of the plurality of gas constituents;
    wherein gases obtained from said rear concentrators are recovered and reused.

21. A gas separation apparatus of claim 20, wherein
said mixture gas having a plurality of gas constituents is PFC gas discharged from a semiconductor manufacturing process and said gas to be treated contains nitrogen as another gas.

22. A gas separation apparatus of claim 21, wherein
said PFC gas contains one of fluorine compounds including at least one element of C, N, and S as a composition element.

23. A gas separation apparatus of claim 22, wherein
said PFC gas includes one of $CF_4$, $NF_3$, $C_2F_6$, $C_3F_8$, $SF_6$, or $CHF_3$.

24. A gas separation apparatus of claim 20, wherein
at least one of said concentrator is a membrane separator which takes advantage of the permeability/impermeability of a membrane.

25. A gas separation apparatus of claim 20, wherein at least one of said concentrator is subzero cooling separator which takes advantage of differences in boiling points.

26. A gas separation apparatus of claim 20, wherein
said chromatographic separator includes a plurality of chromatographic columns which are used in sequence.

27. A gas separation apparatus of claim 20, wherein gas constituents other than the specific gas constituents, separated at said front concentrator or at said separator, contain nitrogen gas as a main constituent and the nitrogen gas is reused for a given usage.

28. A gas separation apparatus of claim 27, further comprising another separator for removing non-nitrogen gas constituents from the gas constituents other than specific gas constituents, that contain nitrogen gas as the main constituent.

29. A gas separation apparatus of claim 20, wherein gas constituents other than the specific gas constituents, separated at said rear concentrator or at said separator, contain nitrogen gas as a main constituent and the nitrogen gas is reused for a given usage.

* * * * *